US006616850B1

(12) United States Patent
Moore et al.

(10) Patent No.: US 6,616,850 B1
(45) Date of Patent: Sep. 9, 2003

(54) WATER FILTER AND METHOD

(76) Inventors: Anthony D. Moore, 7934 Highfill Rd., Summerfield, NC (US) 27358; Harold V. Treece, 1453 Durham Meadows Dr., Burlington, NC (US) 27217

( * ) Notice: Subject to any disclaimer, the term of this patent is extended or adjusted under 35 U.S.C. 154(b) by 0 days.

(21) Appl. No.: 09/949,629

(22) Filed: Sep. 10, 2001

(51) Int. Cl.[7] ............... B01D 24/02; B01D 24/00; B01D 29/00; B01D 29/31; B01D 27/00
(52) U.S. Cl. ............... 210/767; 210/323.1; 210/323.2; 210/451; 210/483; 210/460
(58) Field of Search ............... 210/483, 460, 210/631, 652, 459, 473, 650, 651, 654, 100, 282, 323.1, 323.2, 767, 445, 451, 453, 455; 4/605, 606, 652, 696

(56) References Cited

U.S. PATENT DOCUMENTS

| | | | | |
|---|---|---|---|---|
| 5,178,760 A | * | 1/1993 | Solberg, Jr. ............... | 210/451 |
| 5,510,031 A | * | 4/1996 | Knauf et al. ............... | 210/460 |
| 5,545,314 A | * | 8/1996 | Parise et al. ............... | 210/100 |
| 5,685,981 A | * | 11/1997 | Koslow ............... | 210/282 |
| 5,843,309 A | * | 12/1998 | Mancil ............... | 210/205 |

* cited by examiner

*Primary Examiner*—Joseph Drodge
*Assistant Examiner*—K S Menon

(57) ABSTRACT

A water filter for recreational vehicles (RV) is provided which includes a ceramic filter element having a radial flange attached thereto. The flange facilitates filter assembly and replacement of the filter element in the filter housing. The method of use describes a quick and easy method of replacing the filter element which is advantageous to unskilled persons in assembling and attaching the water filter to the RV.

11 Claims, 5 Drawing Sheets

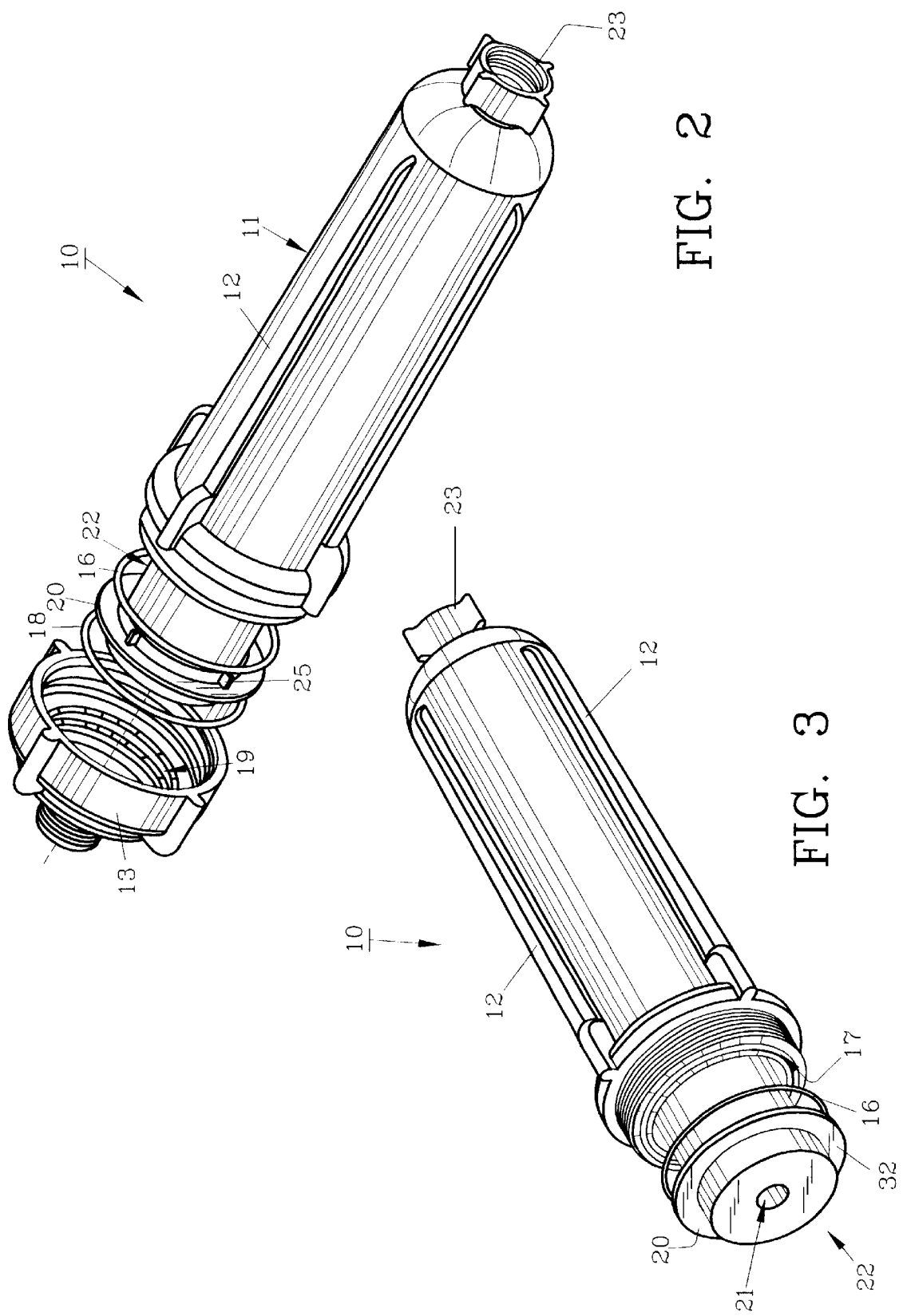

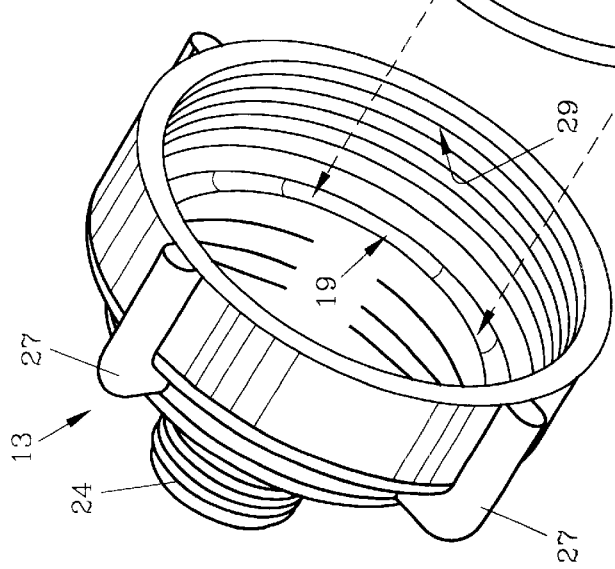
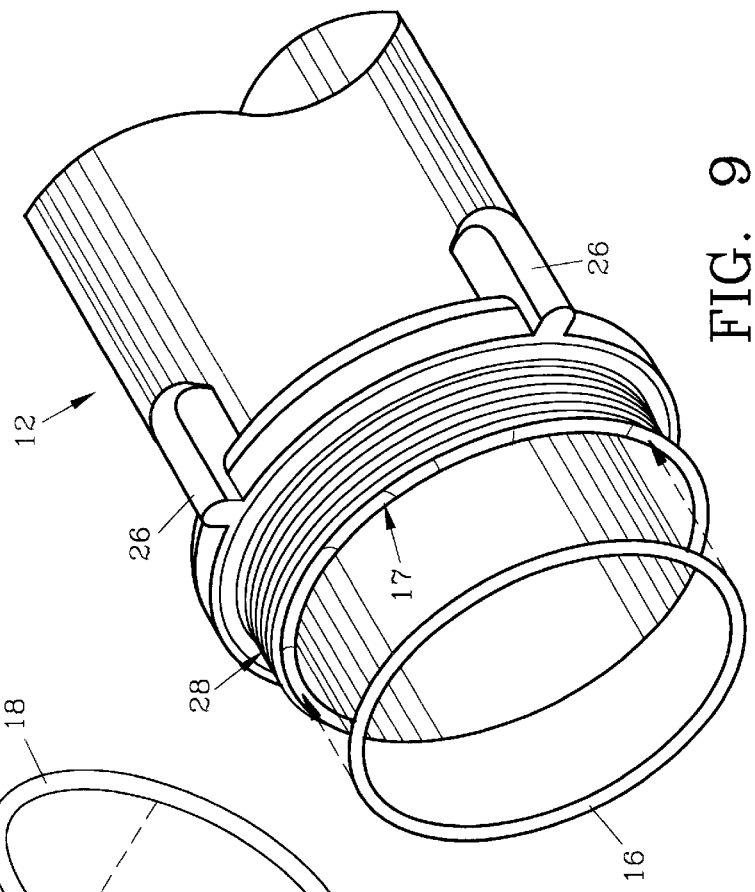

WATER FILTER AND METHOD

FIELD OF THE INVENTION

The invention herein pertains to filters for fresh water, and particularly pertains to a freshwater filter used for an RV (Recreational Vehicle) or the like.

DESCRIPTION OF THE PRIOR ART AND OBJECTIVES OF THE INVENTION

It is usual for recreational vehicles, mobile homes, campers and other vehicles that have indoor plumbing to be connected to a freshwater line while parked, such as at camping grounds, rallies and otherwise. Sometimes fresh water sources contain contaminants which may not be harmful but may have an unpleasant taste, odor or abrasive properties. In order to remedy this problem various filters have been affixed to the RV freshwater inlet, generally on the exterior of the RV. Such water filters utilize many types of cartridges or filter elements including ceramic types having activated carbon and copper/zinc alloy particles which can be exchanged or cleaned and replaced as needed. Certain standard water filters which are available for RV owners are difficult to install and operate while other available filters discourage filter element replacement by untrained persons. Some filter elements do not adequately remove objectionable odors, taste and particles from the water, while others quickly clog and are not practical for their intended uses. Thus, with the present problems and disadvantages of conventional freshwater filters, the present invention was conceived and one of its objectives is to provide a water filter which can be easily assembled and installed by untrained persons.

It is another objection of the present invention to provide a water filter element for an RV or the like which can easily be exchanged and the filter reassembled and reinstalled without special tools or equipment.

It is yet another objective of the present invention to provide a water filter having a ceramic filter element having copper/zinc alloy particles and activated carbon particles therein which adequately removes objectionable odors, debris and the like from fresh water.

It is still another objective of the present invention to provide a water filter which includes a standard ceramic element which is properly contained within the filter housing by the use of an adhesively adhered radially extending flange attached to the cylindrical filter element.

Various other objectives and advantages of the present invention will become apparent to those skilled in the art as a more detailed description is set forth below.

SUMMARY OF THE INVENTION

The aforesaid and other objectives are realized by providing a water filter and method of use whereby an RV operator can quickly, easily and conveniently attach a freshwater line to the RV and have confidence that the delivered water is free of foreign particles, objectionable odors, taste and the like. The water filter includes a housing having a main body with a male threaded end for cooperatively engaging the female threads of a cap. A conventional cylindrical ceramic filter element formed from diatomascus earth containing both a copper/zinc alloy and an activated carbon is provided with a radially extending planar flange which is sandwiched between the cap and the body upon assembly to stabilize and hold the filter element in its correct position. The ceramic filter element is commercially available as from Shen Hung Enterprise Co., Ltd. in Taiwan and sold as "X-Green Ceramic Cartridge". An o-ring mounted in a groove in the male threaded end of the body provides a tight, waterproof, seal and similarly, the cap includes an o-ring mounted in a groove in the female end. At the lower end of the filter body a freshwater threaded inlet allows engagement with the male end of a conventional garden water hose. Water enters the housing body through the inlet and passes into the space between the outer walls of the filter element and the filter housing where, under pressure the water is forced through the filter element containing a copper/zinc alloy and activated carbon. As the water passes through the filter element it enters a central, longitudinal channel which is in fluid communication with a threaded outlet affixed to the cap. The threaded outlet is joined to the plumbing connection on the exterior of the RV, whereby filtered water can be supplied as required to the RV occupants. On schedule or as needed, the water filter can be easily disassembled and the filter element removed and cleaned or replaced for reassembly and reattachment to the RV.

BRIEF DESCRIPTION OF THE DRAWINGS

FIG. 2 illustrates a rear perspective view of the water filter as removed from the RV and with the cap and o-rings exploded therefrom;

FIG. 3 demonstrates a front perspective view of the water filter with the cap removed and the filter element protruding from the filter body;

FIG. 8 shows an enlarged cap as removed from the filter body with an o-ring exploded therefrom;

FIG. 9 features an enlarged fragmented view of the male threaded end of the body with the o-ring exploded therefrom.

DETAILED DESCRIPTION OF THE PREFERRED EMBODIMENTS AND OPERATION OF THE INVENTION

Figure 1:
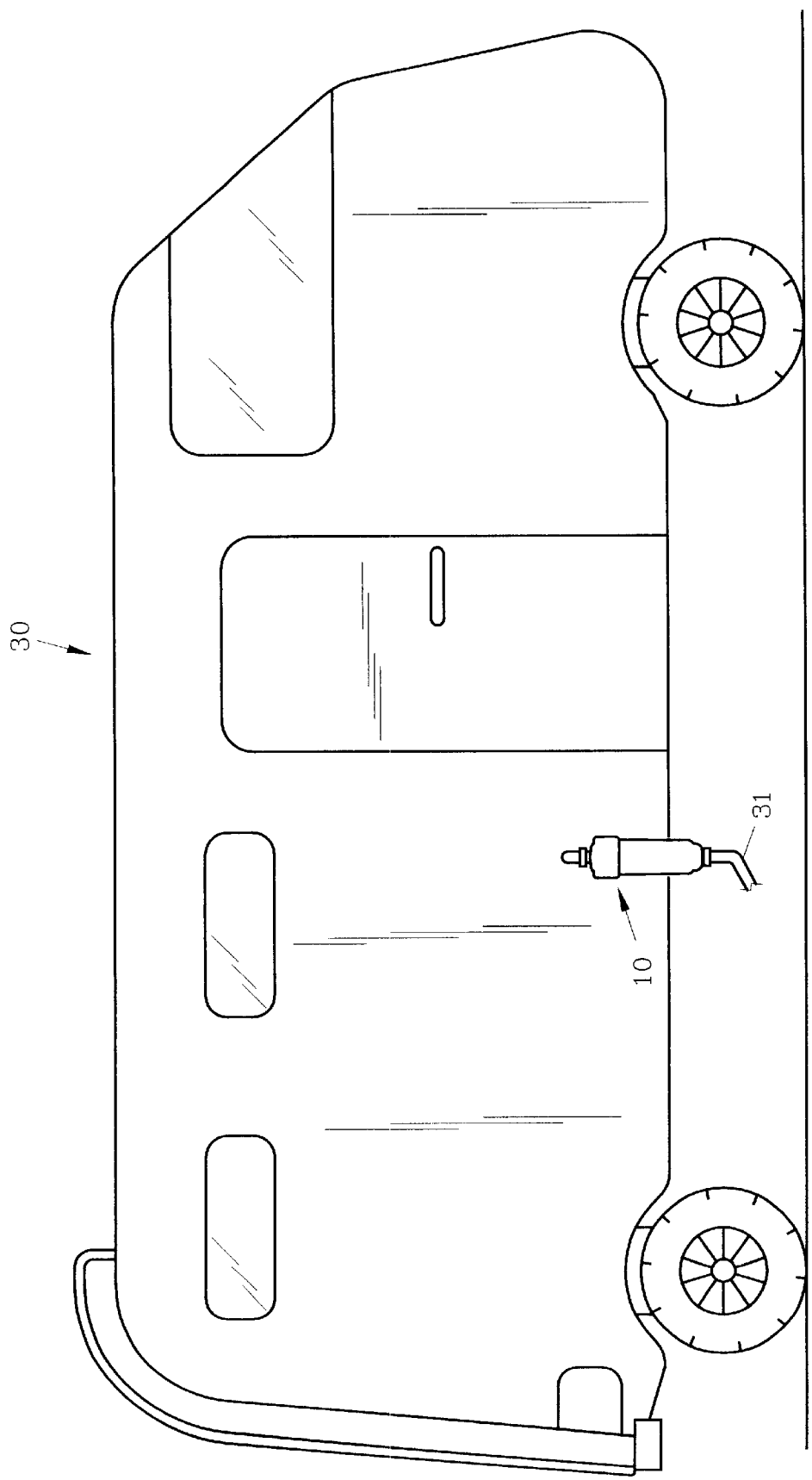
FIG. 1 shows a typical RV with the water filter of the invention positioned thereon.

For a better understanding of the invention and its operation, turning now to the drawings, FIG. 1 demonstrates a typical RV 30 having preferred filter 10 attached thereto for receiving fresh water via garden hose 31, (shown fragmented) which is connected to a conventional water source (not seen). Filter 10 is utilized to remove granular sediment and other impurities, odors, foreign tastes and the like from fresh water received through garden hose 31. As would be understood, filter 10 is connected along the outside of RV 30 to a fresh water (pipe) connection which is standard on most RV's.

Figure 10:
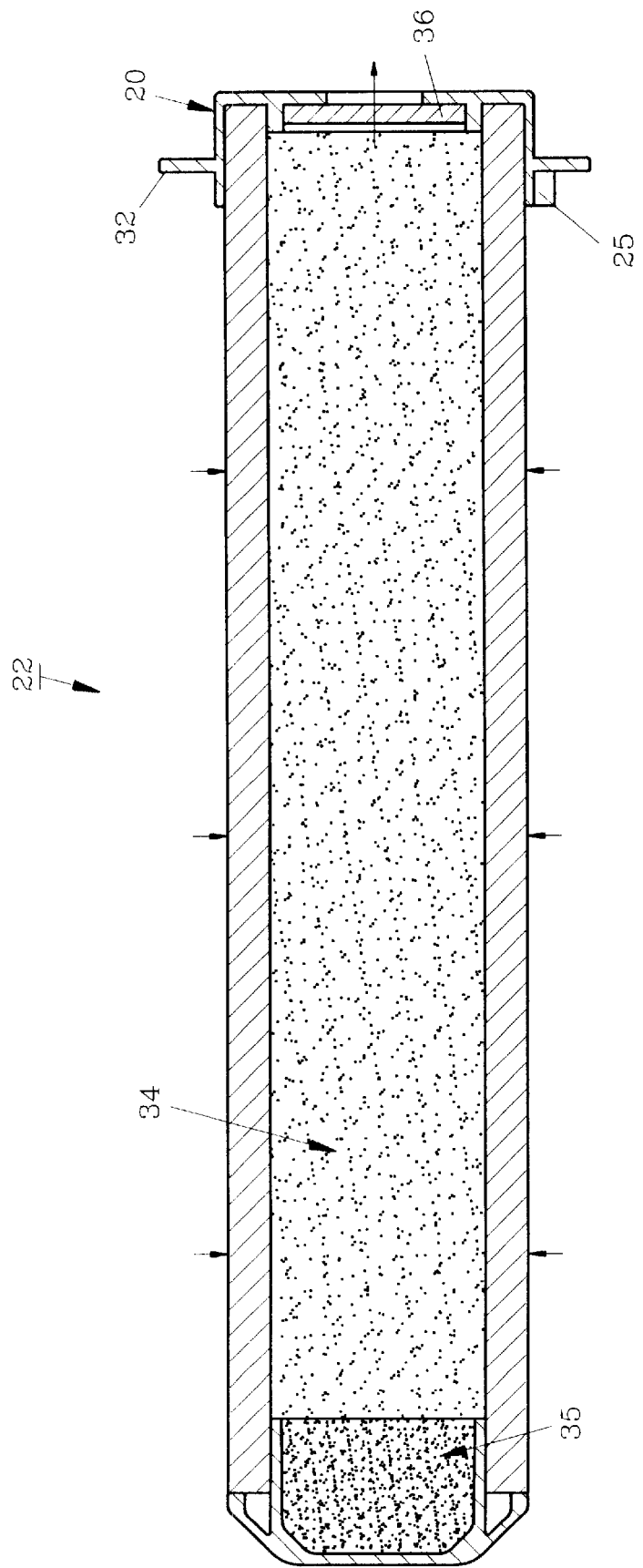
FIG. 10 shows a cross-sectional view of the filter element.

In FIG. 2, preferred water filter 10 includes housing 11 having a main elongated body 12 and a cap 13 both formed of polycarbonate, preferably by injection molding which are threadably joined when assembled. Body 12 defines male threaded end 28 shown enlarged in FIG. 9 which couples with female threaded lend 29 of cap 13, also seen enlarged in FIG. 8. Body 12 provides a longitudinal rib 26 for strength while cap 13 provides a longitudinal rib 27 which also increases the structural integrity thereof. In FIGS. 2 and 3 ceramic filter element 22 is partially exposed which includes flange 20 radially secured thereto, preferably by a two part, waterproof epoxy although other suitable adhesives may be used. FIG. 10 shows a cross section of standard filter element 22 which contains activated carbon particles 34 and copper/zinc alloy particles 35. Filter plate 36, preferably made of Porex® (a trademark of Porex Technologies Corp. of Bohannon Road, Fairburn, Ga. 30213) for a rigid, porous polypropylene homopolymer material with an 1.18 inch diameter (2.99 cm) and a thickness of 0.128 inches (0.32 cm) and having approximately 100 micron openings. Flange 20 is preferably formed of plastic or other suitable materials and as shown, has a diameter greater than filter element 22.

Figure 4:
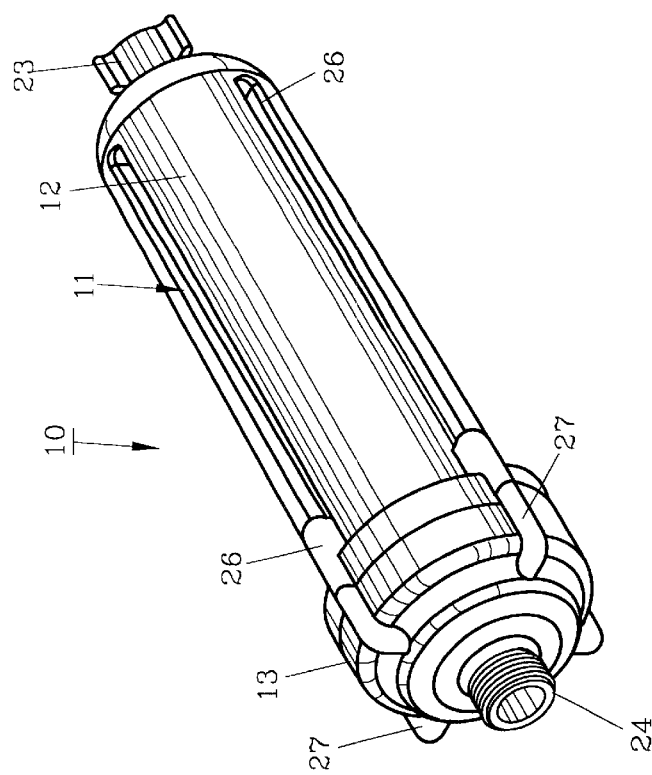
FIG. 4 pictures another front perspective view of the filter in assembled form.
Figure 5:
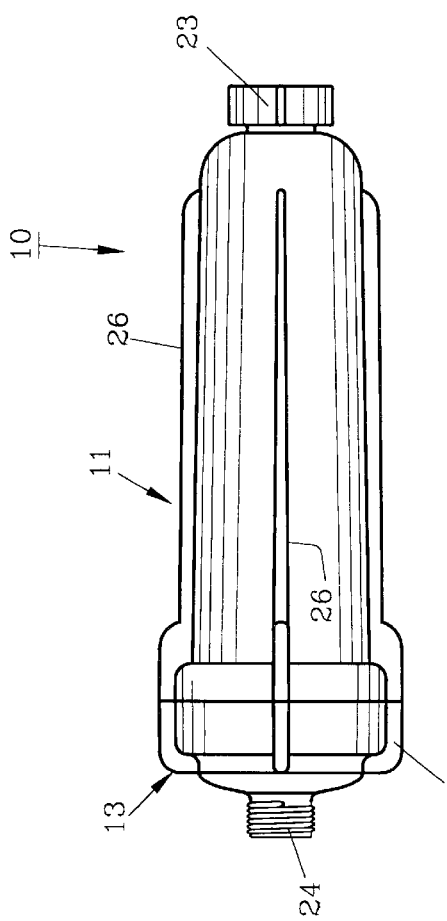
FIG. 5 depicts a right side elevational view of the filter; it being understood that the left side elevational view is a mirror image thereof with the top and bottom plan views being identical thereto.

Standard resilient o-ring 16 and second o-ring 18 in FIG. 2 are used to seal filter housing 11 upon assembly. In FIGS. 4 and 5, housing 11 is shown preferably formed from a rigid plastic, tightly assembled. Thus, as filter element 22 is placed in body 12 of housing 11, flange 20 is positioned against o-ring 16 contained within groove 17 as shown in FIG. 9. Next, as shown in FIG. 2, cap 13 with o-ring 18 contained in groove 19 is then threadably joined to body 12 whereby flange 20 is sandwiched between o-rings 16 and 18, forming tight waterproof seals therewith. Flange 20 stabilizes the position of filter element 22 within filter housing 11 and limits the movement thereof. As explained, filter element 22 is a conventional ceramic water filter element containing activated carbon and a copper/zinc alloy sold under the trademark KDF® as available from General Carbon Corporation of Patterson, N.J Filter element 22 is modified with the addition of flange 20 comprising a radially extending planar section 32 and is adhered to ceramic element 22. Support tabs 25 (FIG. 2) attached to flange 20 insure planar section 32 is properly, radially mounted on cylindrical ceramic filter element 22 and provides strength.

Figure 6:
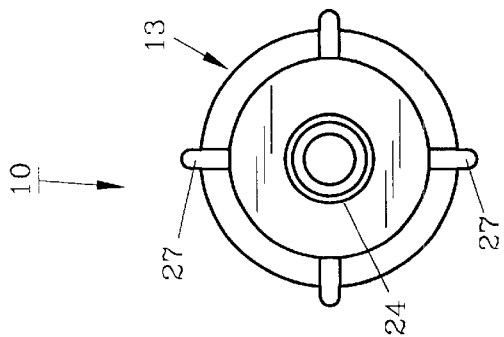
FIG. 6 illustrates a left end view of the water filter as shown in FIG. 5.
Figure 7:
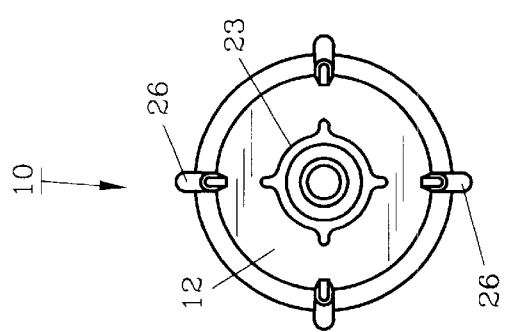
FIG. 7 demonstrates a right end view of the water filter as shown in FIG. 5.

The preferred method of use of water filter 10 includes the assembly of filter 10 as hereinbefore described as ceramic filter element 22 is filled with particles of activated carbon 34 and copper/zinc alloy 35 and with filter plate 36 therein. Filter element 22 is then placed within housing body 11 with flange 20 adhered thereto having integral support tabs 25 affixed. Flange 20 is preferably adhesively connected to conventional ceramic filter element 22 by a suitable, standard waterproof epoxy adhesive. Next, filter element 22 with flange 20 so joined is positioned in housing body 11 with flange 20 contiguous o-ring 16 which resides in groove 17 of body 11. Next, cap 13 is threadably tightened onto male end 28 of body 12 whereby o-ring 18 of cap 13 located in groove 19 and o-ring 16 on body 12 tightly sandwich flange 20 therebetween. With water filter 10 so assembled, threaded outlet 24 (FIG. 6) is then affixed to the conventional threaded fitting on RV 30 as shown in FIG. 1. Next, a commercially available water (garden) hose such as water hose 31, also seen in FIG. 1 is then threadably affixed to water inlet 23 (FIG. 7) on housing 11. Fresh water is then directed through garden hose 31. As water enters filter housing 11 through inlet 23 it moves along the outer surface of filter element 22 in body 12. Such fresh water under pressure then penetrates filter element 22 where it is filled by activated carbon particles 34 and copper/zinc alloy particles 35 and then passes into longitudinal central channel 21 (FIG. 3) said filtered water exits outlet 24 (FIG. 4) on cap 13 and is directed into the RV water system for use by the occupants. Filter 10 allows convenience in replacement of a filter element and while filter element 22 as seen in FIG. 10 is preferred, other filter element types with other internal compositions or particles could likewise be used.

The illustrations and examples provided herein are for explanatory purposes and are not intended to limit the scope of the appended claims.

We claim:

1. A water filter comprising: a housing, said housing comprising a body, said body defining a male threaded end, a cap, said cap defining a female threaded end, said female threaded end for receiving said male threaded end for joining said body to said cap, said male threaded end defining a groove, a first o-ring, said first o-ring positioned in said groove of said male threaded end, said cap female threaded end defining a groove, a second o-ring, said second o-ring positioned in said female threaded end groove, a filter element, said filter element positioned in said housing, a flange, said flange attached to said filter element, a planar section, said planar section attached to said flange and extending radially therefrom, said planar section sandwiched between said first and second o-rings to stabilize said filter element within said housing.

2. The water filter of claim 1 further comprising a water inlet, said water inlet attached to said body.

3. The water filter of claim 1 further comprising a water outlet, said outlet joined to said cap.

4. The water filter of claim 1 wherein said planar section comprises a disk.

5. The water filter of claim 1 further comprising a water inlet, said water inlet attached to said body.

6. The water filter of claim 1 further comprising a water outlet, said water outlet affixed to said cap.

7. The water filter of claim 1 comprising a support tab, said support tab attached to said flange for strengthening said planar section.

8. A method of filtering water comprising the steps of:
 a) assembling a filter having a housing with a cap and a body threadably connected containing a filter element with a flange having a radially extending planar section maintained between a first o-ring on the body and a second o-ring on the cap;
 b) connecting a water hose to the filter body;
 c) allowing water to enter the filter body and pass through the filter element to filter the same; and
 d) allowing the filtered water to exit the filter element through the cap.

9. The method of claim 8 wherein connecting a water hose to the filter body comprises the step of connecting the male end of a garden hose to a water inlet on said filter body.

10. The method of claim 8 wherein allowing water to enter the filter element comprises the step of allowing water to pass from the outer surface of the filter element to a channel therein.

11. The method of claim 8 wherein allowing water to exit the filter element comprises the step of allowing the filtered water to exit through an outlet on the cap.

* * * * *